(No Model.)
O. W. HAEGG.
PLOW JOINTER.
No. 308,335. Patented Nov. 18, 1884.
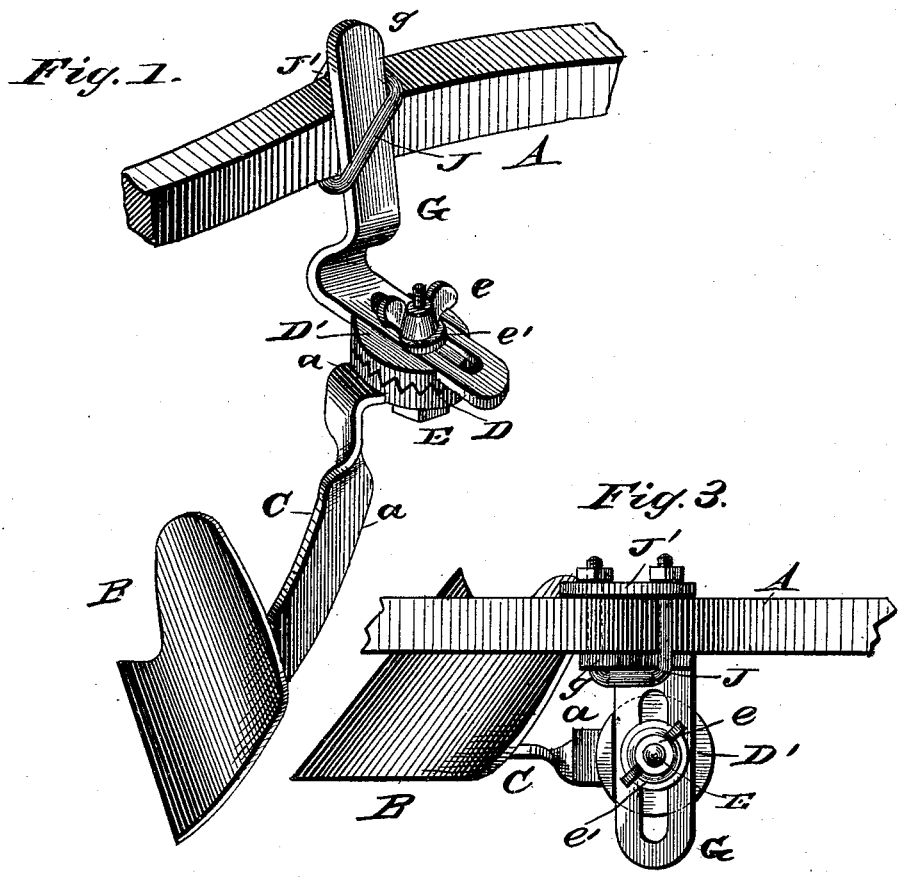
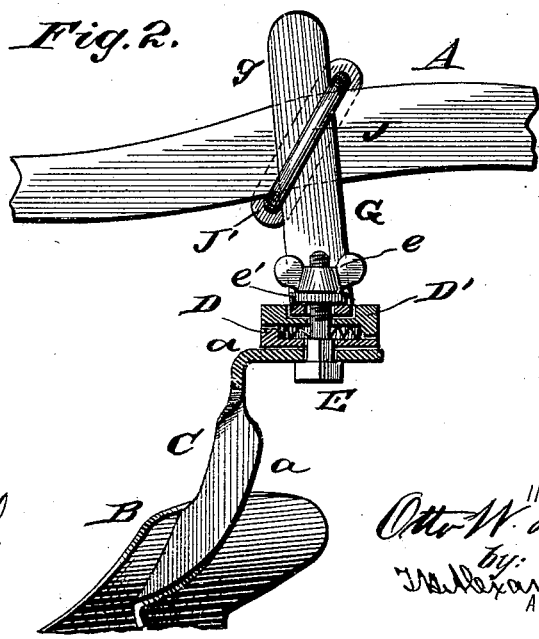

UNITED STATES PATENT OFFICE.

OTTO W. HAEGG, OF ROCKFORD, ILLINOIS.

PLOW-JOINTER.

SPECIFICATION forming part of Letters Patent No. 308,335, dated November 18, 1884.

Application filed July 2, 1884. (No model.)

*To all whom it may concern:*

Be it known that I, OTTO W. HAEGG, of Rockford, in the county of Winnebago and State of Illinois, have invented certain new and useful Improvements in Plow-Jointers; and I do hereby declare that the following is a full, clear, and exact description thereof, reference being had to the accompanying drawings, and to the letters of reference marked thereon, which form part of this specification, in which—

Figure 1 is a perspective view showing a jointer-plow secured to a plow-beam by my improved device. Fig. 2 is a side view, partly in section. Fig. 3 is a plan view.

This invention relates to what are known as "jointer-plows," or small plows which are located in front of the main plow for turning the surface-soil and forming a shallow furrow; and it consists in certain novel devices which are constructed and combined in such a manner that the jointer-plow or mold-board can be adjusted at any angle desired, and also adjusted laterally, as will be fully understood from the following description, when taken in connection with the annexed drawings.

I have not represented in the annexed drawings the main turn-plow, as such plow may be constructed in any well-known manner, and forms no part of my invention.

A designates part of a plow-beam, and B designates the small jointer-plow, which is used to turn the surface-soil in front of the main plow, and thus leave a shallow guiding-furrow therefor. The plow B is suitably secured to a curved standard, C, the upper flat end, $a$, of which is bent backward, as shown in Fig. 2, and fitted into a groove formed in the bottom of a disk, D. Said disk is provided with radial serrations on its upper side.

D' designates a disk corresponding in size to the disk D, which has also corresponding serrations on its bottom side. When the two disks are secured together, they firmly interlock, and are thus prevented from turning about their axis.

E is a headed screw-bolt, which passes upward through the flattened end $a$ of the standard C, through the two disks, and through a slot in the lateral extension of the bracket G, and is secured by means of thumb-nut $c$, pressing upon washer $c'$, which is interposed between the lateral extension of bracket G and the thumb-nut. The slotted lateral extension of the bracket G is recessed into a groove made diametrically across the disk D', which effectually prevents this disk from turning. The vertical extension $g$ of the bracket G is rigidly secured to one side of the plow-beam A by means of a clasp, J, which embraces this beam, a strap, J', which receives through it the screw-threaded ends of the clasp J, and nuts which rigidly confine the parts together. By loosening said nuts the bracket G can be adjusted higher or lower, and, if desired, set nearer to or farther from the main plow. By partly unscrewing the nut $e$ the disks D D' can be separated and the point of the plow B directed at any angle to take more or less land, and, if desired, the jointer-plow, its standard, and the disks can be adjusted laterally, after which the parts can all be rigidly secured in the desired position by tightening the nut $e$.

It will be seen from the above description that by my invention I secure in a very simple and effective manner a universal adjustment of the plow B, and that this plow can be rigidly secured in any desired position.

Having described my invention, I claim—

1. The combination, in a jointer-plow attachment, of the beam, adjustable clasping device, the bracket, the laterally-adjustable disks secured thereto, and the plow-standard secured to said disks, substantially as described.

2. The combination of the grooved and serrated interlocking disks with the flat extension of the plow-standard, the slotted extension of the bracket, and the bolt and nut fastening, substantially as described.

3. The combination of grooved and serrated disks, the grooves in which being adapted to receive the extensions of the plow and bracket, the interlocking serrations on the faces of these disks, the bolt and nut fastening, and a device for rigidly but adjustably securing the said bracket to the plow-beam, all constructed and adapted to operate substantially as described.

4. The combination of the plow-standard, the angular slotted bracket clasped to it, the horizontal serrated interlocking disks vertically pivoted together, and adjustable laterally and also about their pivot, the standard C, and the plow, all constructed and adapted to operate substantially as and for the purposes described.

In testimony that I claim the foregoing as my own I affix my signature in presence of two witnesses.

OTTO W. HAEGG.

Witnesses:
W. T. ROBERTSON,
M. STARR.